United States Patent Office 3,778,461
Patented Dec. 11, 1973

3,778,461
BICYCLOHEPTENE DERIVATIVES
Edward Douglas Brown and Timothy John Leeney, Macclesfield, England, assignors to Imperial Chemical Industries Limited, London, England
No Drawing. Filed Mar. 30, 1972, Ser. No. 239,770
Claims priority, application Great Britain, Apr. 13, 1971, 9,223/71
Int. Cl. C07c 121/48
U.S. Cl. 260—464          4 Claims

ABSTRACT OF THE DISCLOSURE

The disclosure relates to novel bicycloheptene-7-syn-carbaldehydes, a process for their manufacture and their use in the manufacture of prostaglandins and prostaglandin-like compounds.

---

This invention relates to bicycloheptene derivatives, and in particular it relates to bicyclo[2,2,1]heptene derivatives which are valuable intermediates for the manufacture of prostaglandins and prostaglandin-like compounds.

In a known synthesis of prostaglandins and prostaglandin-like compounds the initial stages of the synthetic sequence comprise:

(a) the addition of cyclopentadienyl sodium to chloromethyl methyl ether to give 5-methoxymethyl-1,3-cyclopentadiene I, which is
(b) subjected to the Diels-Alder reaction with 2-chloroacrylonitrile.
(c) The bicyclic chloronitrile II thus produced is hydrolysed to the corresponding bicyclic ketone III, which is
(d) subjected to Baeyer-Villiger oxidation to a bicyclic lactone IV.
(e) The lactone is saponified and iodinated to give a rearranged iodo-lactone V, which is
(f) acetylated, and the produced acetoxy-lactone VI is
(g) de-iodinated to give the methoxymethyl lactone VII.
(h) The methoxymethyl lactone VII is demethylated to the hydroxymethyl lactone VIII, which is
(i) oxidised to the aldehyde lactone IX.

This known reaction sequence is unsuited to the large-scale manufacture of prostaglandins or prostaglandin-like compounds

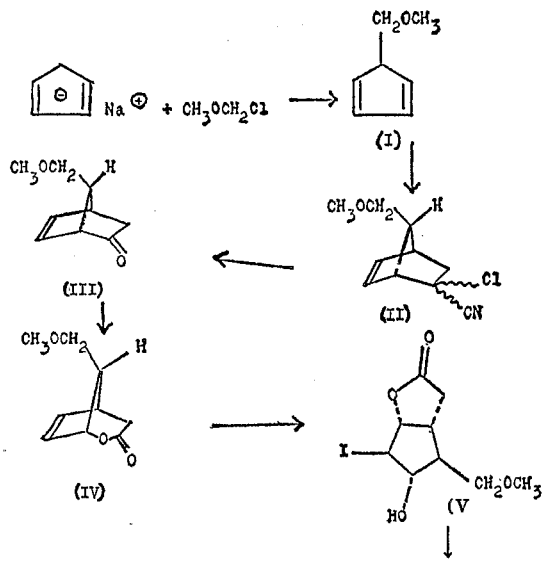

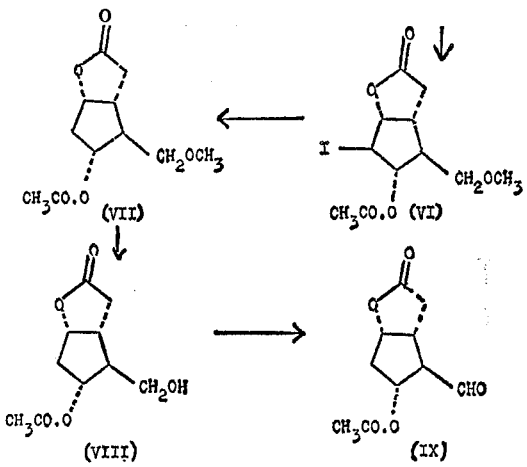

for several reasons of which three of the more important are:

(1) 5-methoxymethyl-1,3-cyclopentadiene I is subject to facile isomerisation to 1-methoxymethyl-1,3-cyclo-pentadiene, which is useless for the purpose of this synthesis. This isomerisation can be minimised by working the reaction of cyclopentadienyl sodium with chloromethyl ether at low temperatures of about $-55°$ C., but such a temperature is inconvenient and uneconomic for large scale manufacture.
(2) the Diels-Alder reaction produces a mixture of the bicyclic chloro-nitrile isomers II, together with an equal amount of other isomers, mainly 5-chloro-5-cyano-1-methoxymethylbicyclo[2,2,1]hept-2-ene. The required isomers II must be separated from the other isomers present, by column chromatography, preparative gas-liquid chromatography or distillation, and the presence in the reaction product of isomers which are useless for the purpose of this synthesis reduces the overall yield of isomers II from sodium cyclopentadienide to about 25%, after purification by chromatography.
(3) the demethylation of the methoxymethyl lactone VII requires the use of boron tribromide, a reagent which is particularly unsuited to use on a large scale by virtue of its generally hazardous nature.

We have now found that the use of a novel, key intermediate avoids the three above-mentioned disadvantages of the above process, in that:

(1) there is no possibility of isomerisation of the starting material,
(2) no 1-substituted bicyclo[2,2,1]heptene derivative is produced in the Diels-Alder reaction, and
(3) in the final stage, the protecting group which requires to be removed to produce an aldehyde such as IX, is readily removed at room temperature and pressure without the use of hazardous reagents.

Thus according to the invention there is provided a bicycloheptene-7-syn*-carbaldehyde of the formula:

*Syn signifies a substituent on the same side of the C–7 bridge as the double-bond.

(X)

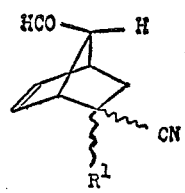

wherein R[1] is a halogen atom.

It is to be understood that the wavy lines in the above formula indicate that either the nitrile group or the group $R^1$ is in the exo configuration and the other group is in the endo configuration, that is, the formula represents a mixture of compounds isomeric at carbon atom 5. It is also to be understood that the above and subsequent formulae herein represent racemates, which may, however, be resolved to lead to a prostaglandin of the natural series.

A suitable value for $R^1$ when it is a halogen atom is, for example, the chlorine or bromine atom.

A preferred bicycloheptene derivative of the invention is 5-chloro - 7 - syn-formylbicyclo[2,2,1]hept-2-ene-5-carbonitrile.

According to a further feature of the invention there is provided a process for the manufacture of a bicycloheptene-7-syn-carbaldehyde of the invention of the Formula X which comprises the hydrolysis of a compound of the formula:

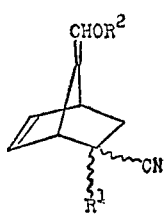

(XI)

wherein $R^1$ has the meaning stated above and $R^2$ is an alkyl, alkanoyl, alkanesulphonyl or arenesulphonyl radical of up to 7 carbon atoms, under such conditions and using such an acid that the initially formed bicycloheptene-7-anti-carbaldehyde of the formula:

(XII)

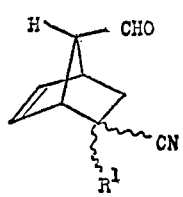

wherein $R^1$ has the meaning stated above, is isomerised to the corresponding bicycloheptene-7-syn-carbaldehyde of the Formula X without substantial decomposition.

A suitable value for $R^2$ is, for example, the t-butyl, acetyl, methanesulphonyl or toluene-p-sulphonyl radical.

By way of example, particular conditions and a particular acid which are suitable for use in the above process involve hydrolysing a compound of the Formula XI wherein $R^1$ is the chlorine atom and $R^2$ is the acetyl radical with 2 N hydrochloric acid (1 part) in dioxan (4 parts) at approximately 85° C. for approximately four days.

The extent of the isomerisation of compound XII to the bicycloheptene X may conveniently be monitored by N.M.R. spectroscopy, by noting the appearance of signals at δ9.50 and 9.57 due to the aldehyde proton of the aldehyde X, having the required stereochemistry at C-7.

The compounds of the Formula XI, which may be used as the starting material in the above process, are themselves novel compounds. Thus, according to a further feature of the invention there is provided a compound of the Formula XI wherein $R^1$ and $R^2$ have the meanings stated above.

According to a further feature of the invention there is provided a process for the manufacture of the novel compounds of the invention of the Formula XI, which comprises reacting a fulvene derivative of the formula:

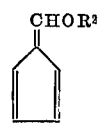

(XIII)

with an olefin of the formula $CH_2:C(CN)R^1$, wherein $R^1$ and $R^2$ have the meanings stated above.

As stated above, compounds of the Formula X are valuable intermediates for use in the synthesis of prostaglandins and prostaglandin-like compounds. Thus, according to a further feature of the invention there is provided a process for the manufacture of a prostaglandin or a prostaglandin-like compound which includes the step of acid hydrolysis of a compound of the Formula XI to a bicycloheptene-7-syn-carbaldehyde of the Formula X wherein $R^1$ and $R^2$ have the meanings stated above under such conditions and using such an acid that an initially formed bicycloheptene-7-anti-carbaldehyde of the Formula XII wherein $R^1$ has the meaning stated above is isomerised to a bicycloheptene-7-syn-carbaldehyde of the Formula X without substantial decomposition.

Suitable conditions and a suitable acid are those described above.

It will be understood that, once the inventive concept of using a compound of the Formula X in the synthesis of a prostaglandin or prostaglandin-like compound has been appreciated, a skilled organic chemist could readily convert the compound of the Formula X to the required product in a number of ways, using standards, known reactions of organic chemistry. One sequence of reactions will now be described, by way of example only, for achieving such a conversion.

5 - chloro-5-cyanobicyclo[2,2,1]hept-2-ene-7-carbaldehyde of the Formula X ($R^1$=chlorine) is reacted with trimethyl orthoformate or with methanol and concentrated hydrochloric acid, to give the dimethyl acetal XIVa which on reaction with 1,2-xylen-α,α'-diol yields the corresponding 1,2-xylen-α,α'-diyl acetal XIVb. The acetal XIVb is hydrolysed with potassium hydroxide in dimethylsulphoxide to the ketone XVb which is subjected to Bayer-Villiger oxidation with m-chloroperbenzoic acid to the lactone XVIb. Lactone XVIb is saponified with sodium hydroxide, neutralised with acetic acid and the product treated with potassium tri-iodide to give an iodohydrin XVIIb, which is reacted with p-phenylbenzoyl chloride to give the ester XVIIIb. The ester XVIIIb is treated with tributyl tin hydride to give the de-iodinated lactone XIXb, hydrogenolysis of which removes the acetal grouping to give the aldehyde XX ($R^3$=p-phenylbenzoyl). The aldehyde XX ($R^3$=p-phenylbenzoyl) is then converted to a prostaglandin or a prostaglandin-like compound in the same way it is known to convert the known aldehyde XX ($R^3$=acetyl) to prostaglandin $F_2\alpha$.

In a modification of this reaction sequence the dimethyl acetal XIVa is itself hydrolysed to give the ketone XVa, which is converted by the sequence of reactions described above, via the lactone XVIa, iodohydrin XVIIa and ester XVIIIa to the de-iodinated lactone XIXa. The lactone XIXa is then selectively hydrolysed in a two phase system of chloroform and concentrated hydrochloric acid so as to remove the dimethyl acetal grouping while leaving the lactone intact to give the aldehyde XX.

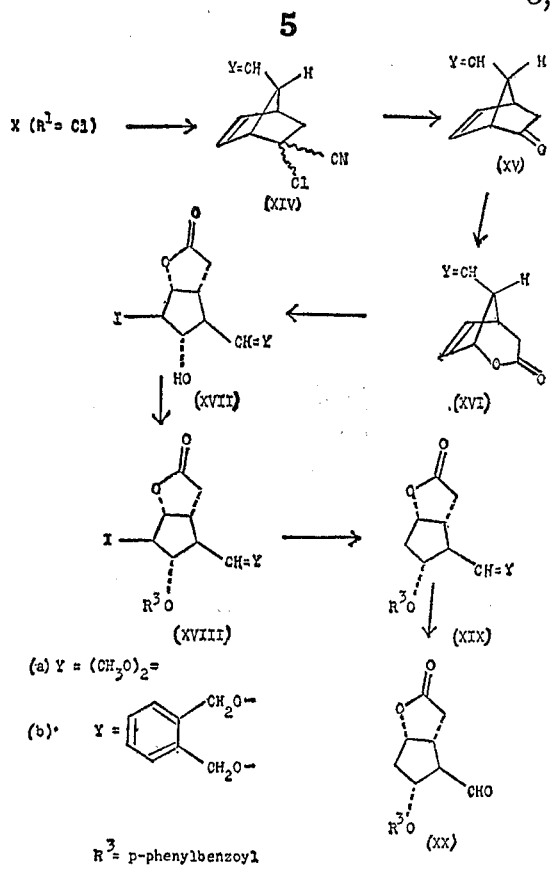

(a) Y = (CH₃O)₂=

(b) Y = [o-xylylene diacetal group]

R³ = p-phenylbenzoyl

The potassium tri-iodide may, of course, be replaced by other known halogenating agents, for example chlorine, bromine or the corresponding N-halogenosuccinimide in an aqueous reaction medium or a derivative of hypochlorous acid for example sodium hypochlorite, to give in known manner a halohydrin, corresponding to the iodohydrins XVII, which may be used in the same way as the iodohydrins XVII. Similarly, other known reducing agents than tributyl tin hydride may be used in the conversion of the esters XVIII to the de-iodinated lactones XIX, for example sodium borohydride or sodium cyanoborohydride (Na·BH₃CN) in dimethylsulphoxide, dimethylformamide, sulpholane or hexamethylphosphoramide, or Raney nickel.

The invention is illustrated, but not limited, by the following examples:

EXAMPLE 1

7-acetoxymethylene-5-chlorobicyclo[2,2,1]hept - 2 - ene-5-carbonitrile, (XI, R¹=chlorine, R²=acetyl), (35.8 g.; 0.16 mole), was dissolved in dioxan (360 ml., purified by passage through grade "0" basic alumina, followed by purging with argon) and 2 N hydrochloric acid (80 ml.; 0.16 mole, purged with argon prior to use) was added, giving a pale yellow solution. The solution was further purged with argon for 30 minutes, and was then heated in an oil bath, to maintain an internal temperature of 85° C.±3° C., for 4 days under an atmosphere of argon. The dioxane was evaporated under reduced pressure, and the residual liquid was basified with saturated aqueous sodium bicarbonate. Water (200 ml.) and methylene chloride (120 ml.) were added, and the resulting suspension was filtered through Celite. The organic layer was separated, and the remaining aqueous solution was extracted with methylene chloride (4× 50 ml.). The organic layers were combined and dried, and the solvent was evaporated under reduced pressure. The residue was dried under high vacuum to give 5-chloro-7-syn-formyl-bicyclo[2,2,1]hept - 2 - ene-5-carbonitrile, (X, R¹=chlorine) as a brown oil. The aldehyde mixture showed 2 spots having $R_F$=0.2 and 0.3 respectively on thin layer chromatography on Merck 0.25 mm. silica gel plates, using methylene chloride as eluent. The spots were detected by spraying the plates with ceric sulphate and then heating the plates. The N.M.R. spectrum in deuteriochloroform of the mixed aldehydes showed the following feafeatures (δ values):

1.79 and 2.26, 1H, doublets, J=14 Hz., endo hydrogen at C-6.
2.48 and 2.84, 1H, double doublets, J=14 and 6 Hz., exo hydrogen at C-6.
2.85 and 3.07, 1H, singlet, hydrogen at C-7.
3.42, 1H, broad singlet, bridgehead hydrogen.
3.66 and 3.80, 1H, broad singlet, bridgehead hydrogen.
6.0–6.6, 2H, complex multiplets, olefinic hydrogens.
9.50 and 9.57, 1H, doublets, J=1 Hz., aldehyde hydrogen.

EXAMPLE 2

Crude α-acetoxyfulvene (XIII, R²=acetyl) (61 g., 0.45 mole) was dissolved in benzene (450 ml., dried over 4A molecular sieves), and freshly distilled 2-chloroacrylonitrile (235 g., 2.68 moles) and hydroquinone (250 mg.) were added. The resulting solution was heated under reflux for 21 hours in an atmosphere of argon. The solvent was evaporated under reduced pressure to give a dark brown oil, which was purified by passage through a column of Florisil (1 kg.) using methylene chloride as eluent, to give 7-acetoxymethylene - 5 - chlorobicyclo-[2,2,1]hept-2-ene-5-carbonitrile as a pale yellow oil, $R_F$=0.4 on thin layer chromatography on Merck silica gel plates, using methylene chloride as eluent. The N.M.R. spectrum of the product in deuteriochloroform showed the following features (δ values):

1.7–2.9, 2H, complex, protons at C-6.
2.08 and 2.09, 3H, complex, methyl protons.
3.3–4.2, 2H, complex, bridgehead protons.
6.1–6.7, 2H, complex, ring olefinic protons.
6.81 and 6.82, 1H, complex, acetoxymethylene olefinic proton.

EXAMPLE 3

5 - chloro - 7 - syn-formylbicyclo[2,2,1]hept-2-ene-5-carbonitrile (X, R¹=chlorine, R²=cyano) (15 g., 0.08 mole), trimethyl orthoformate (26 g., 0.25 mole) and toluene-p-sulphonic acid (710 mg., 4 mmoles) were dissolved in methanol (500 ml.), and the solution was heated under reflux for 20 hours. The solvents were evaporated under reduced pressure and the residual oil was dried under high vacuum using an oil pump, to give a mixture of epimeric dimethyl acetals.

The crude dimethyl acetal mixture was dissolved in benzene (550 ml., dried over 4A molecular sieves), and 1,2-xylene-α,α'-diol (11 g., 0.08 mole) and toluene-p-sulphonic acid (560 mg.) were added. The solution was heated for 13 hours, allowing benzene to distil slowly, and maintaining the volume by the addition of more dried benzene. The solution was cooled, washed with saturated aqueous sodium bicarbonate solution (100 ml.), dried and the solvent removed under reduced pressure. The residue was purified by chromatography on Florisil (420 g.) using methylene chloride as eluent, to give the 1,2-xylene-α,α'-diyl acetal (XIVb) as a pale yellow solid, $R_F$=0.3 on thin layer chromatography on Merck silica gel plates, using methylene chloride as the eluting solvent. The N.M.R. spectrum of the mixed acetals (XIVb) in deuteriochloroform had the following features (δ values):

1.6–2.8, 3H, multiple signals, C-6 and C-7 hydrogens.
3.10, 1H, broad singlet, C-1 hydrogen.
3.36 and 3.50, 1H, broad singlets, C-4 hydrogen.
4.6–5.0, 5H, multiplet, >CH—O—.
6.0–6.5, 2H, multiplet, olefinic.
7.14, 4H, singlet, aromatic.

The acetal (XIVb) (19.4 g., 0.06 mole) was dissolved in dimethylsulphoxide (100 ml., purified by distillation from calcium hydride and stored over molecular sieves) and the solution was purged with argon for 4 hours. At the same time, a solution of potassium hydroxide (13 g.) in water (10 ml.) was heated at 50° C. and purged with argon for 4 hours. The potassium hydroxide solution was then added to the stirred solution of the acetal, and the mixture was stirred under argon at room temperature for 20 hours, during which period a white solid separated. The reaction mixture was poured into 1 N hydrochloric acid (500 ml.), and the mixture was extracted with methylene chloride (4× 200 ml.). The combined organic layers were dried, and the solvent was evaporated under reduced pressure, to give the ketone (XVb) as a white solid, $R_F=0.25$ on thin layer chromatography on Merck silica gel plates, using ethyl acetate/methylene chloride (3:97) as eluent. The N.M.R. spectrum of the ketone (XVb) in deuteriochloroform showed the following features (δ values):

1.99, 2H, singlet+doublet, —C$\underline{H}_2$·CO—.
2.48, 1H, doublet, J=8 Hz., C–7 hydrogen.
3.12 and 3.72, 2H, multiplets, bridgehead hydrogens.
4.7–5.0, 5H, multiplet, >C$\underline{H}$—O—.
6.0 and 6.5, 2H, multiplets, olefinic.
7.15, 4H, singlet, aromatic.

The ketone (XVb) (14.6 g., 57 mmoles) was dissolved in methylene chloride (250 ml., purified by stirring over anhydrous sodium bicarbonate). Anhydrous sodium bicarbonate (9.35 g., 114 mmoles) was added, followed by m-chloroperbenzoic acid (12.5 g., 68 mmoles), and the mixture was stirred for 20 hours at room temperature. The reaction mixture was diluted with methylene chloride (750 ml.) and washed successively with saturated sodium sulphite solution (50 ml.) and saturated sodium bicarbonate solution (2× 50 ml.). The separated organic solution was dried, and the solvent was evaporated to yield the lactone (XVIb) as a white solid, $R_F=0.25$ on thin layer chromatography on Merck silica gel plates, using ether/benzene (1:3) as eluent.

The N.M.R. spectrum of the lactone (XVIb) in deuteriochloroform showed the following features (δ values):

2.48, 1H, doublet, J=8 Hz., C–7 hydrogen.
2.4–2.9, 2H, multiplet, —CH$_2$·CO—.
3.0, 1H, broad singlet, bridgehead hydrogen next to CO.
4.48, 1H, doublet, J=8 Hz.,

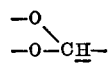

4.80, 4H, singlet, —CH$_2$·O—.
5.07, 1H, broad singlet, bridgehead hydrogen next to 0.
6.2–6.5, 2H, multiplet, olefinic.
7.2, 4H, singlet, aromatic.

The lactone (XVIb) (14.6 g., 54 mmoles) was dissolved in dioxan (153 ml.) and a solution of sodium hydroxide (6.5 g., 162 mmoles) in water (68 ml.) was added at room temperature, with stirring. The stirring was continued for 6 hours, after which time acetic acid was added to bring the solution to approximately pH 7.5. A solution of iodine (40.8 g., 161 mmoles) and potassium iodide (82 g., 483 mmoles) in water (181 ml.) was then added, and the mixture was stirred for 21 hours at room temperature. Solid sodium sulphite was then added to the stirred reaction mixture to destroy the excess of iodine. The suspension thus obtained was filtered off, and the solid was washed with water (3× 50 ml.), followed by acetone (3× 25 ml.). The solid was then dried in vacuo to yield the iodohydrin (XVIIb) as a white solid, $R_F=0.4$ on thin layer chromatography on Merck silica gel plates using methanol/benzene (5:95) as eluent.

The N.M.R. spectrum of the iodohydrin (XVIIb) in d$_5$-pyridine showed the following features (δ values):

2.4, 1H, multiplet, C–4 hydrogen.
2.73, 2H, doublet, J=8 Hz., C–3 hydrogens.
3.03, 1H, multiplet, C–3a hydrogen.
3.53, 1H, singlet, hydroxy.
4.42, 2H, multiplet, C–5 and C–6 hydrogens.
4.82, 4H, multiplet, —CH$_2$·O—.
5.08, 1H, multiplet, C–6a hydogen.
5.30, 1H, doublet, J=4 Hz.,

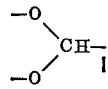

7.13, 1H, singlet, aromatic.

The iodohydrin (XVIIb) (16.3 g., 39 mmoles) was dissolved in pyridine (60 ml., dried over potassium hydroxide pellets), p-phenylbenzoyl chloride (9.7 g., 44 mmoles) was added, and the solution was heated at 50° C. under argon for 27 hours. The solution was cooled to room temperature, water (0.2 ml.) was added, and the mixture was stirred for 30 minutes at room temperature. The pyridine was evaporated under reduced pressure and the residue was dissolved in methylene chloride (500 ml.). This solution was washed successively with 2 N hydrochloric acid (3× 100 ml.), saturated sodium bicarbonate solution (3× 100 ml.) and water (100 ml.). The organic layer was dried and the solvent was evaporated to give a white solid, which was crystallised from a mixture of methylene chloride and ether to give the p-phenylbenzoate ester (XVIIIb) as a white solid, $R_F=0.2$ on thin layer chromatography on Merck silica gel plates, using methylene chloride as eluent.

The N.M.R. spectrum of the p-phenylbenzoate ester (XVIIIb) in deuteriochloroform showed the following features (δ values):

2.42, 1H, multiplet, C–3a hydrogen.
2.72, 2H, singlet+doublet, C–3 hydrogens.
3.25, 1H, multiplet, C–4 hydrogen.
4.41, 1H, double doublet, J=3 and 5 Hz., C–6 hydrogen.
4.7–4.9, 4H, multiplet, —CH$_2$—O—.
5.1, 2H, multiplet, C–6a hydrogen.
5.73, 1H, triplet, J=5 Hz., C–5 hydrogen.
7.0–8.1, 13H, multiplet, aromatic.

A mixture of the p-phenylbenzoate ester (XVIIIb) (14.0 g., 24 mmoles) and benzene (500 ml., dried over type 4A molecular sieves) was heated under reflux until dissolution was complete. The refluxing solution was purged with argon for 30 minutes, and then a solution of tri-n-butyl tin hydride (8.6 g., 29 mmoles) in benzene (10 ml.) was added. The reaction mixture was heated under reflux for 20 hours, allowed to cool to room temperature, and the benzene evaporated under reduced pressure. The resulting solid was triturated with n-pentane (3× 50 ml.) and crystallised from a mixture of methylene chloride and ether to give the de-iodinated ester (XIXb) as a white crystalline solid, M.P. 188–189° C., $R_F=0.3$ on thin layer chromatography on Merck silica gel plates, using a mixture of ethyl acetate and pentane (1:1) as eluent.

The N.M.R. spectrum of the de-iodinated ester (XIXb) in deuteriochloroform showed the following features (δ values):

2.3–3.2, 6H, complex, C–3, 3a, 4 and 6 hydrogens.
4.86, 4H, multiplet, —CH$_2$·O—.
5.05, 2H, multiplet, C–6a and

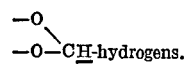

5.50, 1H, multiplet, C–5 hydrogen.
7.1–8.1, 13H, multiplet, aromatic.

The de-iodinated ester (XIXb) (142 mg.) was suspended in methanol (30 ml.) containing 1 drop of concentrated perchloric acid. Palladium oxide (67 mg.) was added, and the suspension was shaken in an atmosphere of hydrogen for 24 hours. The reaction mixture was diluted with methylene chloride (100 ml.) and filtered through celite. The filtrate was washed with saturated sodium bicarbonate solution (10 ml.), the organic layer was separated and dried and the solvent was evaporated. The residue was purified by chromatography to give the aldehyde (XX), $R_F=0.5$ on thin layer chromatography on Merck silica gel plates, using a mixture of ethyl acetate and methylene chloride (1:1) as eluent. The N.M.R. spectrum of the aldehyde (XX) in deuteriochloroform showed the following features ($\delta$ values):

1.9–3.5, 6H, complex, C–3, 3a, 4 and 6 hydrogens
5.15, 1H, triplet, J=6 Hz., C–6a hydrogen
5.79, 1H, multiplet, C–5 hydrogen
7.3–8.2, 9H, multiplet, aromatic
9.84, 1H, singlet, aldehyde The aldehyde (XX) was identical in all respects with a sample prepared by a previously known process.

EXAMPLE 4

5 - chloro - 7 - syn - dimethoxymethylbicyclo[2,2,1]hept-2-ene-5-carbonitrile (XIVa), (45.5 g.) was dissolved in ethanol (450 ml.) containing dimethyl sulphoxide (50 ml., dried over 4A molecular sieves), sodium hydroxide (16.8 g.) was added, and the solution was heated under reflux in an inert atmosphere for 20 hours. The solution was then cooled, diluted with water (500 ml.) and extracted with methylene dichloride (4× 250 ml.). The combined extracts were washed with water (4× 500 ml.) and dried, and the solvent was removed under reduced pressure to give an oil, which on crystallisation from pentane gave the ketone (XVa), M.P. 45° C., $R_F=0.4$ (5% ethylacetate in methylene dichloride). The N.M.R. spectrum of the ketone (XVa) in deuteriochloroform showed the following characteristic features ($\delta$ values):

1.96, 2H, multiplet, —$\underline{CH_2}$·CO—
2.52, 1H, doublet, C–7 proton
3.00, 1H, multiplet ⎤
3.10, 1H, multiplet ⎦ C–1 and C–4 protons
3.24, 3H, singlet ⎤
3.30, 3H, singlet ⎦ methoxy
4.38, 1H, doublet, $(CH_3O)_2$·C$\underline{H}$—
5.98, 1H, multiplet ⎤
6.44, 1H, multiplet ⎦ olefinic protons The ketone (XVa) (111 g.) was dissolved in ether (550 ml.), sodium hydroxide (39.7 ml. of a 10% aqueous solution) was added, and the mixture was stirred and cooled to 0° C. Hydrogen peroxide (186 ml. of 27% w./v. solution) was added dropwise to the stirred mixture, the temperature of which was kept below 10° C. After the addition was complete, the mixture was stirred for 3 hours, the ether layer was separated and the aqueous layer was extracted with ether (2× 100 ml.). The aqueous layer was adjusted to pH 7.4 with glacial acetic acid, cooled to 0° C., and a solution of potassium iodide (887 g.) and iodine (451 g.) in water (1758 ml.) was added. The mixture was stirred at 0° C. for 20 hours, and then the excess iodine was decomposed by the addition of solid sodium sulphite. The aqueous suspension was extracted with methylene dichloride (4× 500 ml.) the combined organic extracts were dried, and the solvent was evaporated under reduced pressure, to give the iodohydrin (XVIIa) as an oil, $R_F=0.3$ (5% ethyl acetate in methylene dichloride). The N.M.R. spectrum in deuteriochloroform showed the following characteristic features ($\delta$ values):

3.39, 6H, singlet, methoxy
4.0, 2H, multiplet, C–5 and C–6 protons
4.40, 1H, doublet, $(CH_3O)_2C\underline{H}$—
4.96, 1H, multiplet, C–6a proton The process described in the latter part of Example 3 was repeated, using the iodohydrin XVIIa in place of the iodohydrin (XVIIb) to give the following intermediates: ester (XVIIIa), M.P. 139–141° C., $R_F=0.6$ (15% methanol in benzene). The N.M.R. spectrum in deuteriochloroform showed the following characteristic features ($\delta$ values):

3.30 and 3.32, 6H, singlets, methoxy
4.41, 1H, quartet, C–6 proton
4.61, 1H, doublet, $(CH_3O)_2C\underline{H}$—
5.10, 1H, quartet, C–6a proton
5.62, 1H, triplet, C–5 proton
7.4–8.1, 9H, multiplet, aromatic protons de-iodinated ester (XIX), M.P. 114–116° C., $R_F=0.3$ (50% ethyl acetate in pentane). The N.M.R. spectrum in deuteriochloroform showed the following characteristic features ($\delta$ values):

3.38 and 3.41, 6H, singlet, methoxy
4.34, 1H, doublet, $(CH_3O)_2C\underline{H}$—
5.04, 1H, multiplet, C–6a proton
5.42, 1H, multiplet, C–5 proton
7.4–8.1, 9H, multiplet, aromatic protons The de-iodinated ester (XIXa) (39.5 g.) was dissolved in chloroform (1980 ml.) containing 2% by volume of isopropanol. Conventrated hydrochloric acid (495 ml.) was added and the resulting two-phase system was stirred at room temperature for 1½ hours. The chloroform layer was then separated, and the aqueous layer was extracted with chloroform (2× 50 ml.). The combined extracts were washed with saturated sodium bicarbonate solution (200 ml.) and the organic solvent was evaporated under reduced pressure in the presence of sodium bicarbonate solution (50 ml.). The resulting suspension was then extracted with ethyl acetate (3× 50 ml.), the combined extracts were dried, and the solvent was evaporated under reduced pressure until crystallisation commenced. The solution was left for crystallisation to go to completion, and the product was filtered off and dried, to give 2,3,3a$\beta$,6a$\beta$-tetrahydro-5$\alpha$-(p-phenylbenzoyloxy)-2 - oxocyclopenteno-[b]furan - 4$\beta$-carbaldehyde (XX), identical in all respects with a sample prepared by a previously known process.

What we claim is:

1. A bicycloheptene-7-syn-carbaldehyde of the formula:

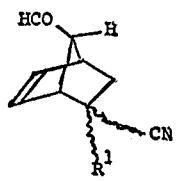

wherein $R^1$ is chlorine or bromine, and the wavy lines indicate that either the nitrile group or the group $R^1$ is in the exo configuration and the other group is in the endo configuration.

2. 5 - chloro - 7-syn-formylbicyclo[2,2,1]hept-2-ene-5-carbonitrile.

3. A bicycloheptene derivative of the formula:

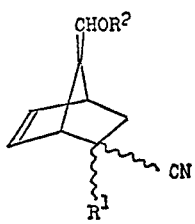

wherein R¹ is chlorine or bromine, and the wavy lines indicate that either the nitrile group or the group R¹ is in the "exo" configuration and the other group is in the endo configuration, and R² is t-butyl, acetyl, methanesulphonyl or toluene-p-sulphonyl.

4. 7 - acetoxymethylene - 5 - chlorobicyclo[2,2,1]hept-2-ene-5-carbonitrile.

References Cited
UNITED STATES PATENTS

| | | | |
|---|---|---|---|
| 2,956,977 | 10/1960 | Caldwell et al. | 260—464 X |
| 3,345,419 | 10/1967 | Tinsley et al. | 260—464 X |
| 3,492,330 | 1/1970 | Trecker et al. | 260—464 X |
| 3,515,740 | 6/1970 | Frampton | 260—464 |

JOSEPH PAUL BRUST, Primary Examiner

U.S. Cl. X.R.

260—340.3, 343.2, 343.3, 456 R, 456 P, 586